Patented Oct. 18, 1949

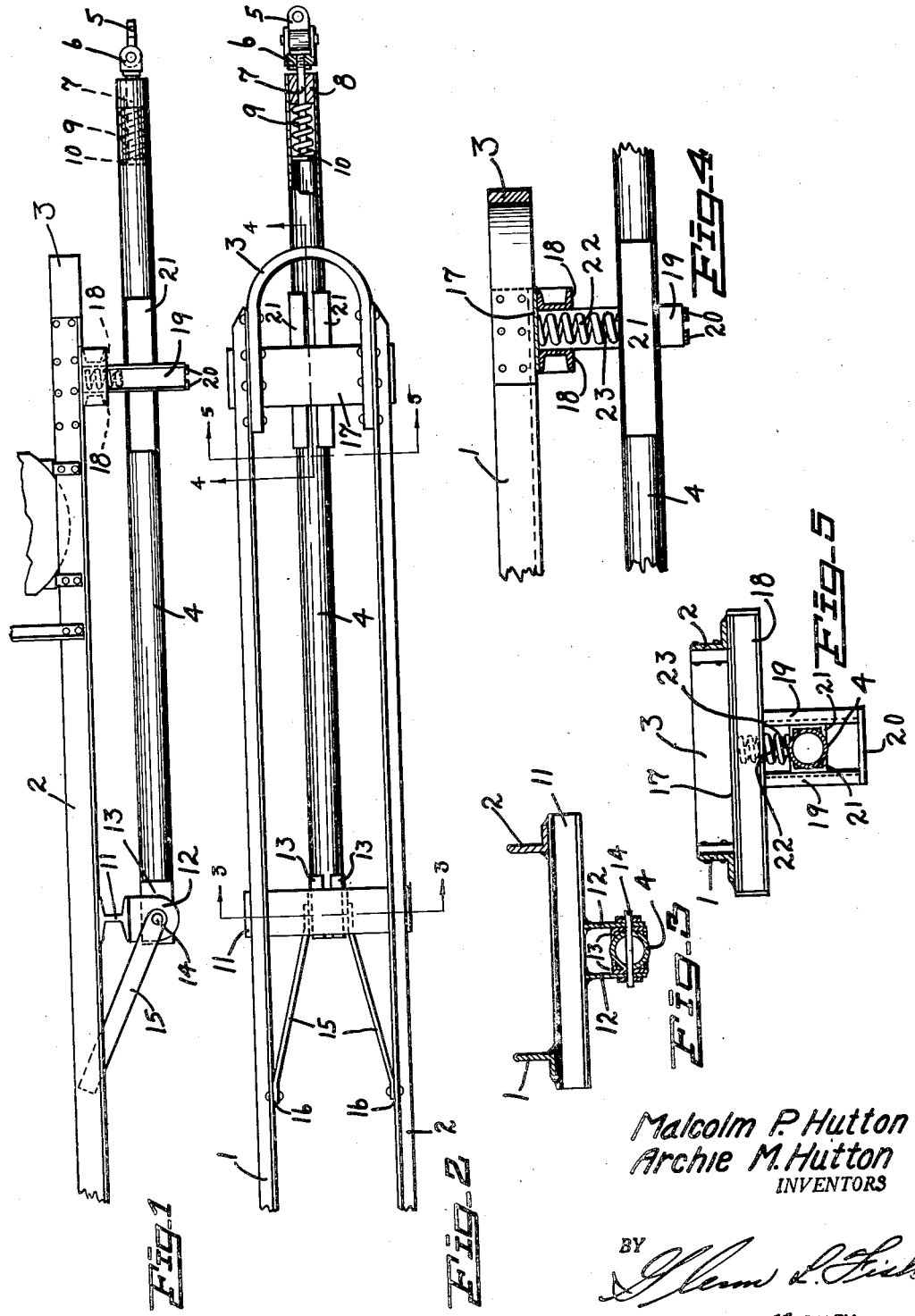

2,484,889

UNITED STATES PATENT OFFICE 2,484,889

RESILIENTLY MOUNTED DRAFT RIGGING

Archie M. Hutton and Malcolm P. Hutton,
Edwall, Wash.

Application August 19, 1946, Serial No. 691,545

2 Claims. (Cl. 280—33.9)

Our present invention relates generally to agricultural wheeled vehicles or implements of the harvester type, and especially to combines that are towed by a tractor; and more specifically the invention relates to and is involved in an improved resiliently mounted draft-rigging for a combine to which the tractor may be coupled or hitched.

As is well known many existing combines, in addition to the supporting wheels, utilize a pilot wheel at the front or hitching end of the supporting frame, and difficulty is encountered when making a sharp turn as at the end of a field due to penetration or digging of the pilot wheel into the ground surface.

In carrying out our invention we dispense with the use of the pilot wheel and equip an extension of the supporting frame of the combine with a resiliently mounted draft rigging to which the tractor is coupled or hitched, by means of which shocks, strains, and stresses of the traveling implement are cushioned and absorbed to avoid breakage of parts and to insure an effective draft means for the implement.

The invention consists in certain novel combinations and arrangements of parts as will hereinafter be described and more specifically set forth in the appended claims.

In the accompanying drawings we have illustrated one complete example of the physical embodiment of our invention wherein the parts are combined and arranged according to one mode we have devised for the practical application of the principles of our invention.

Figure 1 is a view in side elevation of a draft rigging in which our invention is embodied.

Figure 2 is a top plan view of the appliance of Fig. 1.

Figure 3 is a transverse sectional view at line 3—3 of Fig. 2 showing the pivotal unit of the draft tongue.

Figure 4 is a vertical longitudinal sectional view at line 4—4 of Fig. 2; and

Figure 5 is a transverse vertical sectional view at line 5—5 of Fig. 2.

In order that the general arrangement and utility of parts may readily be understood we have shown in the drawings a front extension of the main or supporting frame of a combine, which includes a pair of laterally spaced parallel longitudinally extending angle bars 1 and 2 that are rigidly united at their front ends by a U-shaped yoke 3 riveted or bolted in place between the ends of the bars.

For taking up slack and absorbing or cushioning strains and stresses between the towing tractor and the combine, a tubular draft tongue 4 of cylindrical shape, which is suspended centrally of and beneath the extension frame, is equipped with a resiliently mounted hitch for a tractor that includes a coupling head 5 pivoted upon a vertical axis in a clevis 6. The clevis is provided with a draw bar or bolt 7 that is reciprocably mounted in a block or head 8 welded within the front end of the cylindrical tongue, and a spring 9 is coiled about the bolt and interposed between the head 8 of the tongue and a fixed head 10 welded on the inner end of the draw bolt or bar.

At its rear end the tubular cylindrical tongue is pivotally suspended or supported from the extension frame, to swing in a vertical plane upon a horizontal axis, in order that the draft tongue may readily adapt itself to irregularities of the ground surface, and for this purpose the pivot or hinge unit includes a transversely arranged short I-beam 11 that is preferably welded to the undersides of the frame bars 1 and 2.

A pair of vertically arranged and spaced plates 12, 12 are welded to the under face of the cross beam to form a bearing bracket, and bearing blocks 13, 13, of channel shape or having inner concave faces for engagement with the exterior surface of the cylindrical tubular tongue are interposed between the opposite sides of the tongue, to which they are welded, and the plates of the bracket, to insure a wide and substantial bearing for the pivoted tongue.

A pivot pin 14 passes transversely through the bracket plates, the tongue, the bearing blocks, and also through the front ends of a pair of braces 15, 15, that diverge rearwardly from the pivot assembly, and at its rear end each of these braces is riveted or bolted, at 16, to an angle bar 1 and 2.

To retain the pivotally suspended draft tongue against lateral displacement and to guide the pivotal movement of the tongue in a vertical plane as it conforms to irregularities in the ground surface over which the combine is traveling, a transversely arranged frame is rigidly mounted on and projects below the bars 1 and 2 of the extension frame. This frame is made up of a transversely extending plate 17 preferably welded to the two bars 1 and 2, a pair of cross bars 18, 18 of channel shape, which are also welded to the under sides of the transverse plate, and a yoke including a pair of vertically disposed and laterally spaced channel irons 19, 19, that are welded at their upper ends between the cross channel irons 18, 18, with their lower ends united by welded cross plates 20, 20.

For mounting the vertically movable or suspended and cylindrical tubular draft tongue within the guide yoke or frame, a pair of bearing plates 21, 21, of channel shape are rgidly mounted, as by welding, at opposite sides of the tongue, for frictional engagement or sliding engagement with the spaced guide plates 19, 19.

A vertically arranged spring 22 is mounted by means of a stud bolt 23 on the top surface of the tongue, and the upper end of the spring bears against the under side of the plate 17, to absorb shocks when the implement is traveling over rough terrain.

Having thus fully described our invention what we claim as new and desire to secure by Letters Patent is:

1. In a vehicle draft rigging, the combination with a horizontal supporting frame having a rear bearing bracket, and a cylindrical draft tongue pivotally supported in the bracket, of a forwardly spaced horizontally extending and transversely arranged upper plate rigid with the supporting frame, a pair of spaced transversely arranged cross bars rigid with the under side of the upper plate, a yoke including a pair of spaced channel bars rigid with the plate and having adjoining inner plane faces, a pair of longitudinally extending channel plates mounted on the exterior surface of the draft tongue and having outer plane faces for frictional engagement with the faces of the yoke, and a coiled spring interposed between the upper face of the tongue and the lower face of the upper plate.

2. In a vehicle draft rigging, the combination with a supporting frame, a longitudinally extending tubular cylindrical draft tongue, a front frame rigid with the supporting frame, and means for resiliently mounting the tongue in the front frame, of a rearwardly mounted transversed I-beam rigid with the supporting frame, a pair of spaced vertical plates rigid with the I-beam and having inner spaced plane faces, a pair of horizontal and diagonally arranged braces uniting the supporting frame and the vertical plates, a pair of radially opposed bearing blocks longitudinally mounted on the tongue and having plane faces for frictional engagement with the inner faces of the vertical plates, and a pivot pin passing transversely through said pairs of plates, blocks the braces and the tongue.

ARCHIE M. HUTTON.
MALCOLM P. HUTTON.

REFERENCES CITED

The following references are of record in the file of this patent:

UNITED STATES PATENTS

| Number | Name | Date |
|---|---|---|
| 671,698 | Hennessey | Apr. 9, 1901 |
| 1,183,880 | Johnston | May 23, 1916 |
| 1,203,299 | Atkins | Oct. 31, 1916 |
| 1,840,435 | Davis | Jan. 12, 1932 |